W. J. ADAMS.
FERTILIZER DISTRIBUTER.
APPLICATION FILED AUG. 28, 1908.
928,835.
Patented July 20, 1909.
3 SHEETS—SHEET 1.
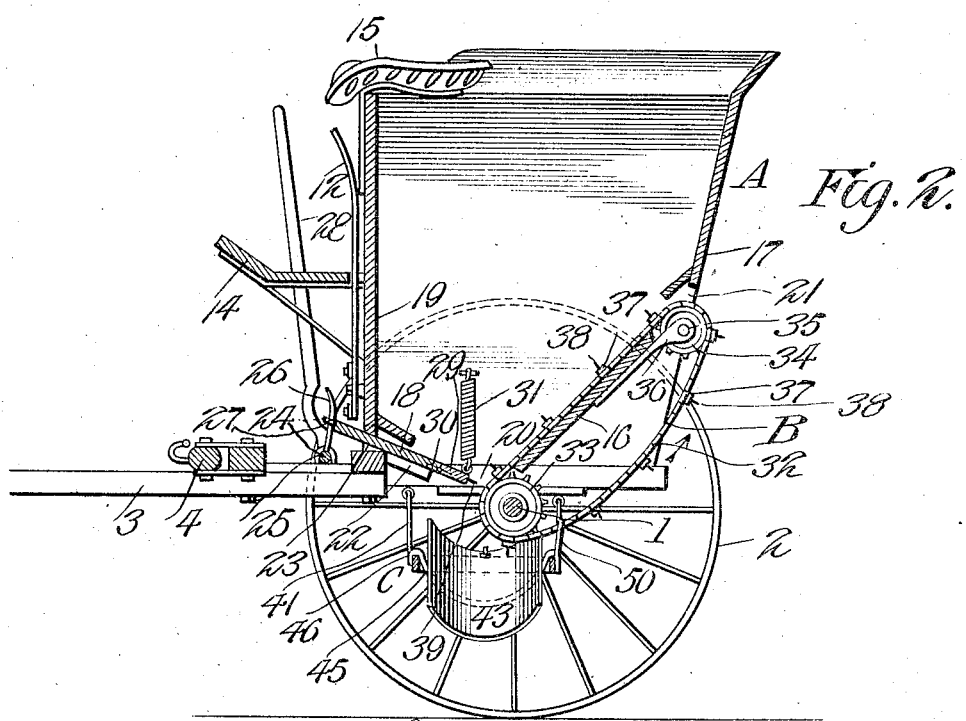
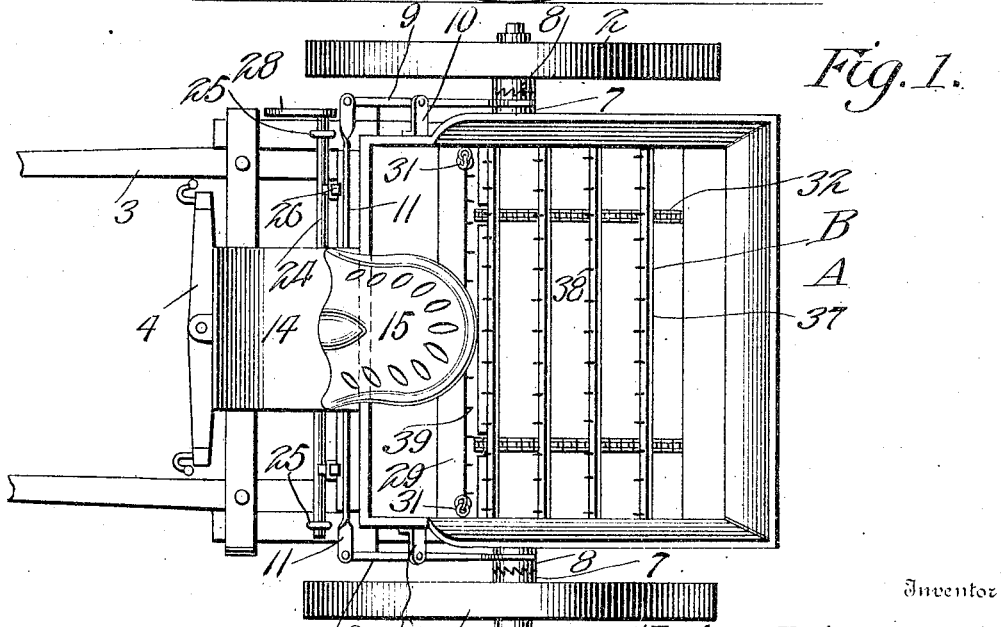
Witnesses
Ho. Ackman Jr.
C Bradway
Inventor
William J. Adams,
By Victor J. Evans
Attorney W. J. ADAMS.
FERTILIZER DISTRIBUTER.
APPLICATION FILED AUG. 28, 1908.
928,835.
Patented July 20, 1909.
3 SHEETS—SHEET 2.
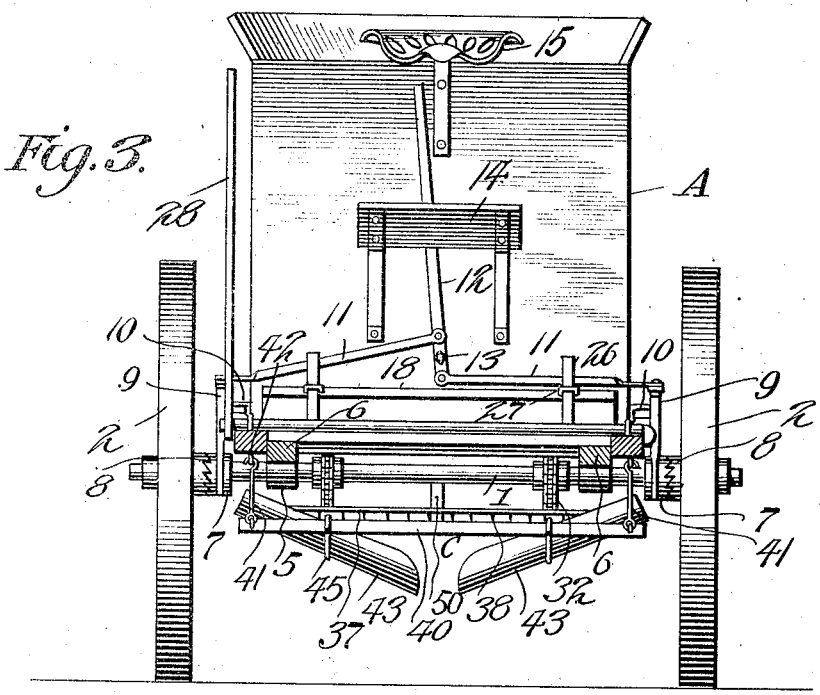
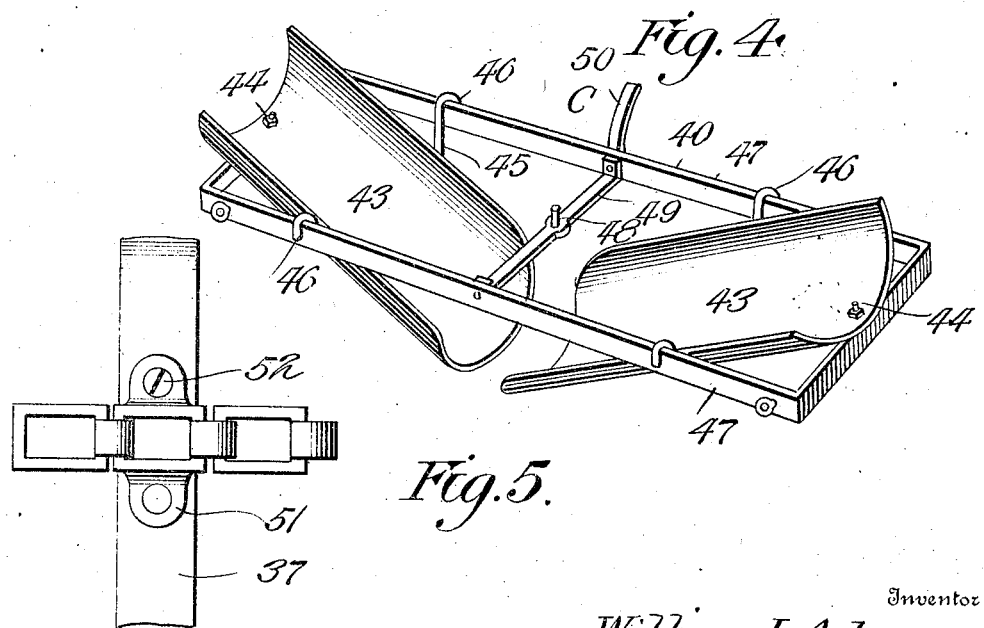
Witnesses
H. Ackman Jr.
C. Bradway
Inventor
William J. Adams,
By Victor J. Evans
Attorney W. J. ADAMS.
FERTILIZER DISTRIBUTER.
APPLICATION FILED AUG. 28, 1908.
928,835.
Patented July 20, 1909.
3 SHEETS—SHEET 3.
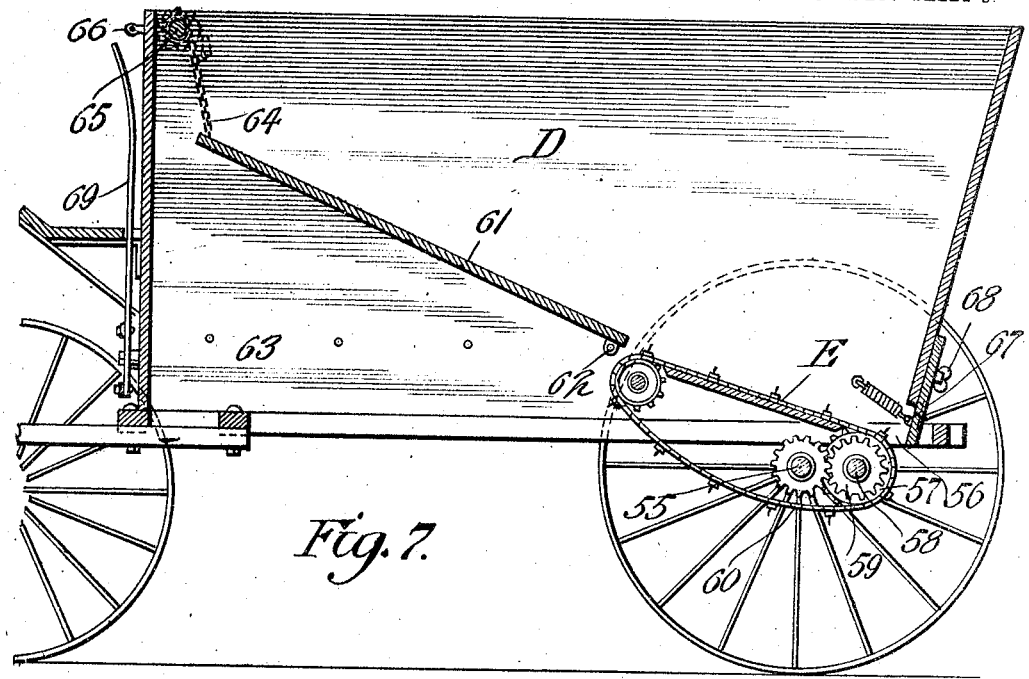
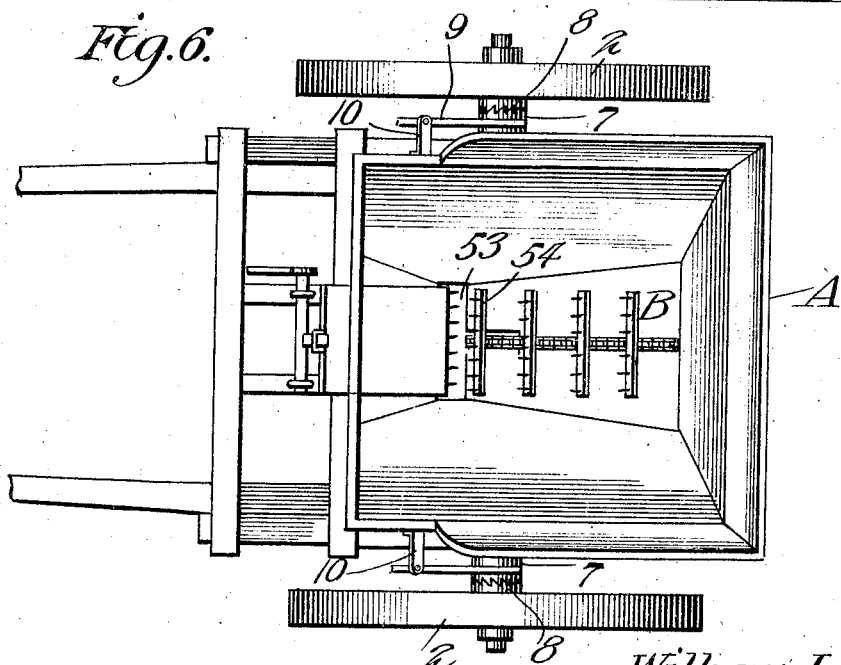
Witnesses
Inventor
William J. Adams
By Victor J. Evans
Attorney

UNITED STATES PATENT OFFICE.

WILLIAM J. ADAMS, OF MOBILE, ALABAMA.

FERTILIZER-DISTRIBUTER.

No. 928,835.     Specification of Letters Patent.     Patented July 20, 1909.

Application filed August 28, 1908. Serial No. 450,685.

*To all whom it may concern:*

Be it known that I, WILLIAM J. ADAMS, a citizen of the United States, residing at Mobile, in the county of Mobile and State of Alabama, have invented new and useful Improvements in Fertilizer-Distributers, of which the following is a specification.

This invention relates to a machine for distributing fertilizer such as barnyard manure and relates more particularly to a distributer of that type adapted for broadcasting or drilling.

The invention has for one of its objects to improve and simplify the construction and operation of machines of this character so as to be comparatively simple and inexpensive to manufacture, thoroughly reliable and efficient in use, and readily adjusted to suit the conditions of the work.

Another object of the invention is the provision of an improved device arranged in the hopper or body of the machine to operate on the bottom of the mass of manure therein to tear away the particles from the mass by a raking or cutting action so as to pulverize the manure and at the same time cause the mass of manure to feed by gravity toward the device, the said device also serving as a conveyer to move the fine separated particles to the distributing opening or mouth of the hopper.

A further object of the invention is the employment of a driving mechanism including clutches whereby the axle of the machine can be connected with the traction wheels so as to derive power from the latter for operating the raking or pulverizing device.

A still further object is the provision of a regulator disposed at the mouth or distributing opening of the hopper and arranged in coöperative relation with the raking or pulverizing device to control the discharge of the fertilizer, the regulator including means for permitting stones, twigs or the like to pass through the mouth without producing undue strain on the working parts.

An additional object of the invention is the employment of an attachment whereby the fertilizer can be distributed in one or more rows when broadcasting is not desired.

With these objects in view and others, as will appear as the description proceeds, the invention comprises the various novel features of construction and arrangement of parts which will be more fully described hereinafter and particularly pointed out in the claims appended hereto.

In the accompanying drawings which illustrate certain embodiments of the invention, Figure 1 is a plan view of a broadcasting distributer constructed in accordance with the invention. Fig. 2 is a vertical longitudinal section thereof with the drilling attachment in place. Fig. 3 is a front view of the machine showing the attachment set to fertilize a single drill or row. Fig. 4 is a perspective view of the attachment. Fig. 5 is an enlarged detail view of the device for connecting an endless chain to one of the spike or dog carrying slats or raking elements. Fig. 6 is a plan view of a modified form of machine designed to distribute the fertilizer in a single row. Fig. 7 is a vertical longitudinal sectional view of a modified machine of larger capacity.

Similar reference characters are employed to designate corresponding parts throughout the several views.

Referring to the drawings, A designates the body or hopper of the machine which is mounted on an axle or shaft 1 that is provided at its outer ends with traction wheels 2 and connected with the body are thills 3 carrying a swingletree 4 for attaching a draft animal to the machine. The axle 1 is mounted to rotate in bearings 5 secured to the sills 6 of the body and on the shaft or axle 1 are sliding clutch members 7 that are adapted to engage clutch elements 8 formed on the hubs of the wheels 2. The sliding members 7 are thrown into or out of engagement by levers 9 fulcrumed on bearings 10 at the sides of the body A and having their forward ends connected by links 11 with an operating lever 12. This lever is fulcrumed at 13 to the front of the body A and projects upwardly through the driver's platform 14 so that the driver sitting in the seat 15 can readily reach the lever. When the lever is shifted in one direction the member 7 will be clutched to the traction wheels so as to rotate the shaft 1 which operates the working parts of the distributer and by moving the lever in the opposite direction the shaft 1 is unclutched from the traction wheel so that the machine can be moved from place to place without the working parts operating.

The hopper or body A as shown in Figs. 1 to 3 inclusive permits the fertilizer to be discharged from the bottom but it is to be understood that the fertilizer can be discharged from any other suitable point. The bottom of the hopper is formed by an inclined plate 16 extending downwardly and forwardly from the back wall of the hopper or body, and by a plate or board 18 that inclines downwardly and rearwardly from the front wall 19. The lower edges of the plates 16 and 18 are spaced apart to form a discharging mouth or opening 20 through which the fertilizer is delivered. The upper end of the plate 16 is spaced apart from the bottom of the back wall 17 so as to provide an opening 21 for accommodating the endless chains of the raking or pulverizing mechanism. The plate 18 is slidably mounted on ledges 22 and the front portion passes forwardly through an opening 23 in the front of the body adjacent the bottom thereof for connection with means for moving the plate back and forth to vary the size of the discharge opening or mouth 20 to suit the nature of the fertilizer. This means comprises a rock shaft 25 disposed in front of the body A and journaled in bearing 25 on the thills and on the rock shaft are upwardly extending crank arms 26 that engage in eyes 27 on the plate 18 so as to move the latter back and forth by the rocking of the shaft. On the shaft 24 is an operating lever 28 within convenient reach of the driver. The plate 18 is provided with yielding member 29 in the form of a strip that extends along the mouth 20 and is connected with the plate by hinges 30 which permit the said member to swing downwardly against the tension of a spring 31 when a stone, twig or the like is being forced through the mouth, the spring being secured to the sides of the body A and to the end of the member 29.

The raking or pulverizing device designated generally by B is so arranged and designed as to operate on the bottom of the mass of manure in the body or hopper by tearing or cutting away the particles and conveying them to the discharging mouth. The raking or pulverizing device thus undermines the mass of manure in the hopper so that the weight of the mass will cause the manure to feed by gravity into operative relation to the device for enabling the latter to maintain a uniform distribution of the fertilizer. The device B comprises endless chains or elements 32 that pass around sprockets 33 on the axle shaft 1 and sprockets 34 on the shaft 35 that is disposed horizontally at the opening 21 of the hopper and mounted in bearings 36 on the inclined bottom plate 16. One half or flight of the chain rides on the inner surface of the inclined plate 16 while the other flight is disposed entirely outside of the hopper, the chains moving into the opening 21 and out of the mouth 20 in the direction indicated by the arrow, Fig. 2. Secured to the chains are transversely extending raking or pulverizing elements 37 in the form of strips or slats that are provided with short teeth or spikes 38 that project upwardly into the mass of manure so as to effectively tear away or separate the particles. The slats 37 are spaced apart a suitable distance so that the loose particles separated by the teeth will drop upon the plate 16 and lodge between adjacent slats so that the latter as they are moved forwardly will discharge the particles through the mouth 20. On the edge of the strip 29 of the mouth regulating plate 18 is provided with spikes 39 which work between the spikes 38 of the raking device so that the manure will be effectively broken up in passing through the mouth.

The mouth 20 extends entirely across the hopper so that the fertilizer can be distributed broadcast and if it is desired to distribute the fertilizer into rows an attachment designated generally by C is employed. This row or drill distributing attachment C comprises a supporting frame 40, Figs. 2, 3 and 4, which is detachably mounted under the mouth 20 of the hopper by means of hooks 41 that engage in staples or eyes 42 on the bottom of the hopper. On the frame 40 are a pair of trough shaped chutes 43 that are loosely fastened to the ends of the frame 40 by bolts 44 that pass through slots in the chutes and the chutes are supported at any inclination to each other by resting in stirrups or supporting members 45 that are provided with terminal hooks 46 that engage over the front and rear members 47 of the frame 40. By shifting these stirrups inwardly or outwardly the inclination of the chutes can be varied for regulating the feed of the fertilizer into the row or drill. In order to distribute the fertilizer into two rows at a time the chutes 43 are detached from the bolts 44 and applied to the bolt 48 on the cross bar 49 secured to the middle of the frame 40 while the chutes are supported as before in the stirrups 45. In order to facilitate the flow of fertilizer down the chutes the frame 40 is adapted to be agitated. For this purpose the frame is provided with an upwardly extending finger 50 that is located in the path of the spike carrying slats 37 so that the latter will strike the finger and agitate the frame 40 that carries the chutes 43, the links 41 providing the necessary flexibility for the vibration of the frame. The slats 37 are spaced apart and secured to the chains 32 and as shown in Fig. 5 only those links of each chain disposed over the slats are provided with apertured lugs 51 for connecting the chain by fastenings 52 to the spike carrying slats 37.

In Fig. 6 a construction is shown especially adapting the machine for distributing fertilizer in a single row and the discharge opening 53 of the hopper is relatively short as are also the spike carrying elements 54 of the raking or pulverizing device. The walls of the hopper are inclined inwardly and downwardly toward the mouth and pulverizing device and the other parts of the machine are substantially similar to that shown in the other figures.

Fig. 7 illustrates a machine of larger capacity than the forms hereinbefore described and the same comprises a body D which is supported upon a rear axle 55 and on the front truck of an ordinary farm wagon. In the bottom of the body at the rear is a discharge mouth 56 and the fertilizer is delivered through the mouth by the raking or pulverizing device E which discharges rearwardly. This device E is driven by sprocket wheels 57 on a counter shaft 58 that is rotated by pinions 59 and 60 on the counter shafts and rear axle 55 respectively. In front of the device E is a false bottom 61 hinged to the sides of the body D at 62 and normally resting on cross rods 63. This false bottom has its front end attached to a chain 64 that winds around a shaft 65 which shaft can be turned by an operating crank 66 so that the false bottom can be gradually elevated to throw the mass of manure in the front of the body backwardly to the raking or pulverizing device E. The size of the mouth 56 can be regulated by a hinged adjusting spring-pressed plate 67 secured to the back of the body D and held in place by clamping nuts 68. At the front of the wagon is a controlling lever 69 whereby the rear wheels can be clutched to the axle.

From the foregoing description, taken in connection with the accompanying drawing, the advantages of the construction and of the method of operation, will be readily apparent to those skilled in the art to which the invention appertains, and while I have described the principle of operation of the invention, together with the apparatus which I now consider to be the best embodiment thereof, I desire to have it understood that the apparatus shown is merely illustrative and that such changes may be made when desired as are within the scope of the claims appended hereto.

Having thus described the invention, what is claimed as new is:—

1. A fertilizer distributing machine comprising a hopper or body provided with a mouth, a plate in the hopper inclined downwardly toward the mouth, an endless element running over the inner face of the plate, spaced slats secured to the element and extending transversely thereto, spikes on the slats to rake into the bottom of the mass of fertilizer in the hopper for separating and loosening the particles thereof, a plurality of relatively-fixed spikes disposed in the path of the spikes on the slats and between which the latter spikes move, wheels for supporting the hopper, and means for clutching the wheels to the said element for driving the latter.

2. A fertilizer distributing machine comprising a wheel supported hopper or body, a mouth, an endless element passing through the mouth, means for driving the element by the wheels of the body, a plurality of toothed members secured to and moving with the element and extending transversely thereto, a relatively fixed toothed member adjustable back and forth with respect to the path of the toothed member for varying the size of the mouth, and means for throwing the endless element out of operation, the teeth on the movable members being arranged to pass between the teeth on the fixed member.

3. A fertilizer distributing machine comprising a hopper or body provided with an opening and with a mouth disposed below the opening, an inclined plate disposed between the opening and mouth, an endless element arranged to run on the plate and passing through the opening and mouth, spaced toothed members carried by the element, and means for driving the element.

4. A fertilizer distributing machine comprising a hopper or body provided with an opening and with a mouth disposed below the opening, an inclined plate disposed between the opening and mouth, an endless element arranged to run on the plate and passing through the opening and mouth, spaced toothed members carried by the element, a toothed member disposed along the mouth and arranged with its teeth in a position to work through the teeth of the movable members, and controllable means for driving the element.

5. A fertilizer distributing machine comprising a hopper or body, a mouth at the bottom thereof, a device for regulating the width of the mouth and including a yieldingly mounted member, teeth on the member, a raking or pulverizing device arranged to pass through the mouth from inside the body or hopper and disposed to work on the bottom of the mass of manure in the hopper, wheels supporting the hopper, and a controllable driving mechanism between the wheels and raking device.

6. A fertilizer distributing machine comprising a hopper or body having a discharge mouth and an opening located above the mouth, an inclined plate between the mouth and opening, an endless element riding over the plate and passing into the hopper through the opening and out of the hopper through the mouth, a plurality of tooth carrying members secured to the element, an adjustably mounted plate disposed at one side of the mouth for varying the size thereof and provided with a plurality of teeth between which the teeth on the said members pass, mechanism for adjusting the plate, wheels supporting the hopper, a rotatable axle for the wheels, and means for clutching the axle to the wheels for actuating the said element.

7. The combination of a broadcasting fertilizer distributer including a hopper provided with a mouth and a device movable through the mouth to deliver the fertilizer, with an attachment for delivering the fertilizer from the mouth to one or more rows, said attachment comprising a vibratory frame supported under the mouth, adjustable chutes mounted on the frame, means for agitating the attachment by the said device.

8. A drill attachment for broadcasting fertilizer distributers comprising a supporting frame, means for detachably mounting the frame on the distributer, chutes reversibly mounted on the frame, and means for changing the inclination of the chutes, in combination with a device for agitating the chutes by a moving part of the distributer.

9. The combination of a distributer including a raking or pulverizing device, with an attachment for discharging fertilizer into drills, and means between the attachment and device for agitating the former by the latter.

10. The combination of a distributer including a device for reducing the fertilizer into particles, with a chute supported in position to receive the particles, and an agitator for the chute actuated by the said device.

In testimony whereof I affix my signature in presence of two witnesses.

WILLIAM J. ADAMS.

Witnesses:
JOHN L. FLETCHER,
C. BRADWAY.